(12) United States Patent
Nelson

(10) Patent No.: US 11,387,708 B2
(45) Date of Patent: Jul. 12, 2022

(54) ALTERNATOR SYSTEM FOR AN ELECTRIC VEHICLE

(71) Applicant: Louis Obyo Nelson, Abuja (NG)

(72) Inventor: Louis Obyo Nelson, Abuja (NG)

( * ) Notice: Subject to any disclaimer, the term of this patent is extended or adjusted under 35 U.S.C. 154(b) by 397 days.

(21) Appl. No.: 16/701,424

(22) Filed: Dec. 3, 2019

(65) Prior Publication Data

US 2020/0195092 A1     Jun. 18, 2020

Related U.S. Application Data

(60) Provisional application No. 62/778,364, filed on Dec. 12, 2018.

(51) Int. Cl.
*H02K 7/18* (2006.01)
*F03G 7/08* (2006.01)

(52) U.S. Cl.
CPC ............ *H02K 7/1846* (2013.01); *F03G 7/08* (2013.01)

(58) Field of Classification Search
CPC ................................ H02K 7/1846; F03G 7/08
See application file for complete search history.

(56) References Cited

U.S. PATENT DOCUMENTS

| | | |
|---|---|---|
| 3,181,018 A | 4/1965 | Shafranek et al. |
| 3,341,763 A | 9/1967 | Noddin |
| 6,091,231 A | 7/2000 | Prunty et al. |
| 6,690,145 B2 | 2/2004 | Stevens et al. |
| 2001/0008191 A1 * | 7/2001 | Smith ............. B60L 8/00 180/65.265 |
| 2007/0170791 A1 | 7/2007 | Hargett |

FOREIGN PATENT DOCUMENTS

| | | | |
|---|---|---|---|
| CN | 201590739 U * | 9/2010 | |
| WO | WO-2009034321 A1 * | 3/2009 | ........ B60C 23/041 |

* cited by examiner

*Primary Examiner* — Jianchun Qin
(74) *Attorney, Agent, or Firm* — Boudwin Intellectual Property; Daniel Boudwin

(57) ABSTRACT

An improved alternator system for an electric vehicle. The system includes a magnetic connector attached to a rim of a vehicle wheel. The magnetic connector is connected to a magnetic bar. The magnetic bar increases the magnetic field produced by the magnetic connector. The magnetic bar is magnetically connected to a rotator located within an alternator. As the rim rotates the magnetic bar will be rotated causing the rotator within the alternator to rotate. This will engage the alternator to produce power.

10 Claims, 3 Drawing Sheets

ALTERNATOR SYSTEM FOR AN ELECTRIC VEHICLE

CROSS REFERENCE TO RELATED APPLICATIONS

This application claims the benefit of U.S. Provisional Application No. 62/778,364 filed on Dec. 12, 2018. The above identified patent application is herein incorporated by reference in its entirety to provide continuity of disclosure.

BACKGROUND OF THE INVENTION

The present invention relates to an improved alternator system for electric vehicles. More particularly, the present invention provides an alternator system that is included on the axels of an electric vehicle.

There is a new trend in vehicles, manufactures are starting to create vehicles that run on power sources other than fossil fuels. One of the most popular fuel alternatives is electric power. Even top end brands are making waves in electric cars or hybrid vehicles. These brands include Porsche, BMW, Aston Martin, and Tesla just to name a few. One of the biggest drawbacks to this new vehicle power source is the electric capacity of the batteries which power the car.

Electric vehicles provide cleaner transportation that does not produce substantial gaseous waste product, such as exhaust; however, because vehicle battery technologies are still evolving, the operative range of electric vehicles is lower than desired, and the charge time is longer than desired. It is desirable that these vehicles have a longer operative range, thereby requiring fewer stops to recharge the battery or batteries that power these vehicles. Achieving this result may require a source of energy that is reliable and renewable.

Batteries can weigh a massive amount and cause cars to be extremely heavy. This means that even by adding more batteries the vehicles range could decrease. Quick charge stations have become a regular site when travelling but these stations can still take an hour or more to charge the vehicle to an adequate level. Many different solutions have come about to solve this battery issue.

One of the current ways is to add additional alternators to a vehicle. These alternators cannot provide indefinite energy as perpetual energy is against current laws of nature. However, placement of the alternators can dramatically extend battery life. Sometimes alternators have been attached to wheels or axels to vehicles. However, a more efficient for these alternators to work is still required.

Consequently, there is a need in for an improvement in the art of vehicle alternators. The present invention substantially diverges in design elements from the known art while at the same time solves a problem many people face when having to constantly recharge their electric vehicles. In this regard the present invention substantially fulfills these needs.

SUMMARY OF THE INVENTION

The present invention provides an improved alternator system for an electric vehicle wherein the same can be utilized for providing convenience for the user when using an electric vehicle. The improved alternator system for an electric comprises, a magnetic connector attached to the rim of a wheel of a vehicle. A magnetic bar removably connected to the magnetic connector. The magnetic bar is connected to a rotator within the improved alternator, wherein the magnetic bar does not make physical contact with the alternator.

The improved alternator system for an electric vehicle of claim 1, wherein the magnetic connector has a magnetic pole opposite the magnetic bar and the magnetic connector is magnetically connected to the magnetic bar.

Another object of the improved alternator system for an electric vehicle is to have the magnetic bar be magnetically connected to the rotator within the improved alternator.

Another object of the improved alternator system for an electric vehicle is to have a vehicle axel is placed through the improved alternator.

Another object of the improved alternator system for an electric vehicle is to have an electrical connection from the improved alternator to a battery.

Another object of the improved alternator system for an electric vehicle is to have a plurality of alternators be operably connected within a single vehicle. This will increase the amount of output from the alternators increasing the vehicle range.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
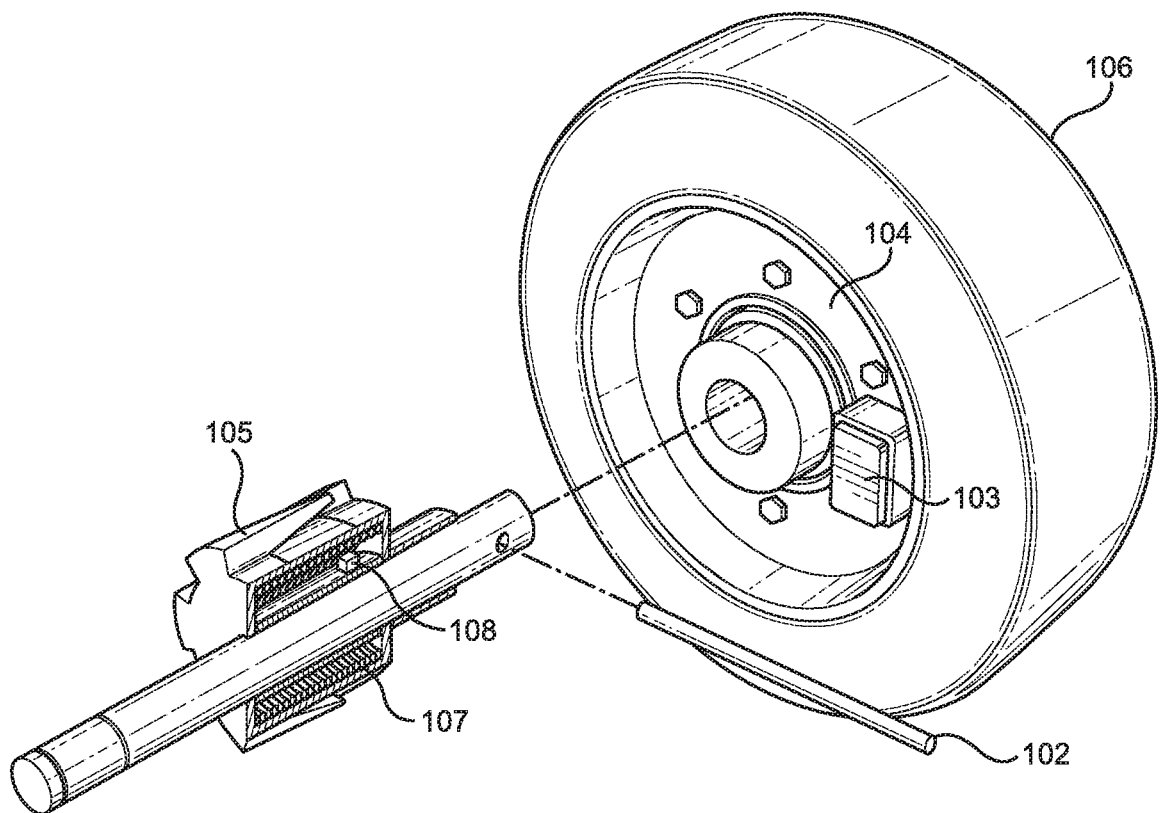
FIG. 1 shows an exploded view of an embodiment of the unproved alternator system for an electric vehicle.

Reference is made herein to the attached drawings. Like reference numerals are used throughout the drawings to depict like or similar elements of the improved alternator system for an electric vehicle. For the purposes of presenting a brief and clear description of the present invention, a preferred embodiment will be discussed as used for the alternators that are included on electric cars. The figures are intended for representative purposes only and should not be considered to be limiting in any respect.

Referring now to FIG. 1 there is shown an exploded view of an embodiment of the alternator for the improved alternator system for an electric vehicle. The improved alternator system includes a wheel connector 103. The wheel connector 103 is connected to the rim 104 of the vehicle wheel 106. In one embodiment the wheel connector 103 is located near the edge of the rim 104. In one embodiment the wheel connector 103 is a magnet.

The wheel connector 103 configured to magnetically attached to magnetic bar 102. The magnetic bar will rotate when the wheel 106 turns. In one embodiment the magnetic bar 102 protrudes on both ends of the magnetic connector 103. This will happen when the magnetic connector 103 is located closer to the middle of the rim 104. In one embodiment the magnetic bar 102 protrudes out of a single side of the magnetic connector 103. This will happen when the magnetic connector 103 is located closer to the edge of the rim 104 of the vehicle wheel 106. The magnetic bar 102 being an elongated bar will allow for a larger magnetic field.

There is an improved alternator that has no belts or physically connected drives. The improved alternator 105 is configured to be attached to the vehicle near the magnetic bar 102. The interior of the improved alternator 105 has a stator 107. In one embodiment the stator 107 is a plurality of copper wires. In another embodiment the stator is a sheet of copper. The interior of the improved alternator 105 further has a rotator 108. The rotator 108 has a magnetic pole that is opposite of the magnetic bar 102. The rotator is configured to rotate around the interior of the improved alternator 105 creating an electric current.

Figure 2:
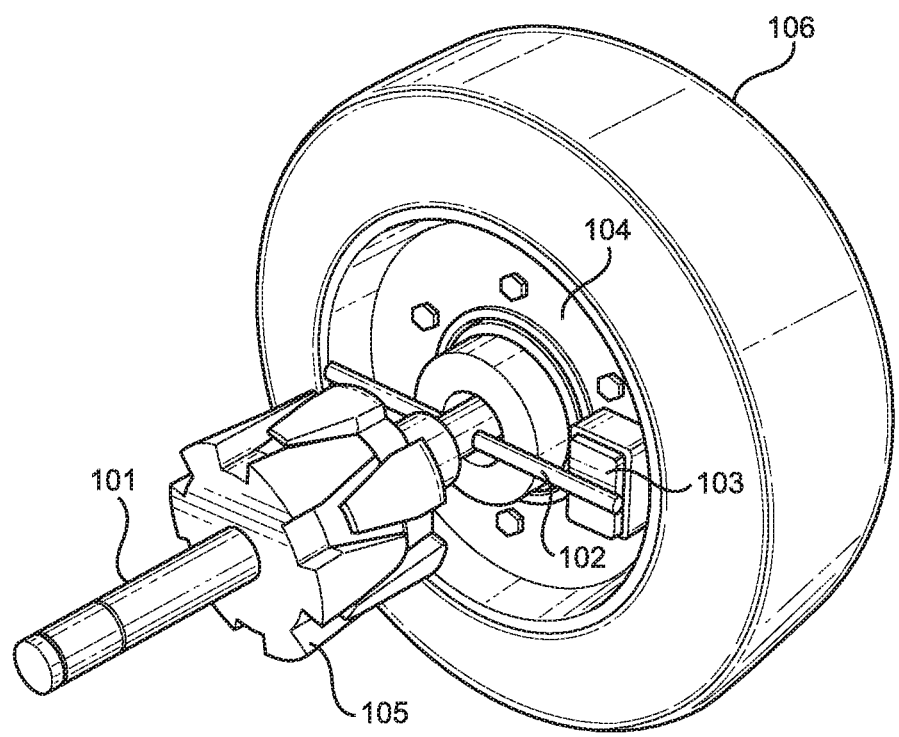
FIG. 2 shows a perspective view of an embodiment of the improved alternator system for an electric vehicle.

Referring now to FIG. 2 there is shown a perspective view of an embodiment of the improved alternator system for an electric vehicle. In some embodiments the improved alternator 105 is configured to be fitted around the axel of the vehicle 101. In this embodiment the improved alternator 105 will have an aperture 201 located through the middle. This aperture 201 will allow the axel of the vehicle 101 to be placed therethrough. In this embodiment the improved alternator 105 will have connectors located within the underside of a vehicle that will attach the improved alternator to the vehicle. This will prevent the axel 101 from rubbing on the improved alternator 105.

When connected to a vehicle the magnetic bar 102 will attach to the magnetic connector. In some embodiments the magnetic bar is configured to be placed through the axel of the vehicle 101. In another embodiment the magnetic bar 102 is configured to go around the axel of the vehicle 101. The improved alternator 105 is then attached to the vehicle in close proximity to the magnetic bar 102. The magnetic bar 102 has a strong enough magnetic polarity that it can attract the rotator located within the alternator. This will cause the rotator to spin as the magnetic bar is spun by the vehicle wheel 106.

Figure 3:
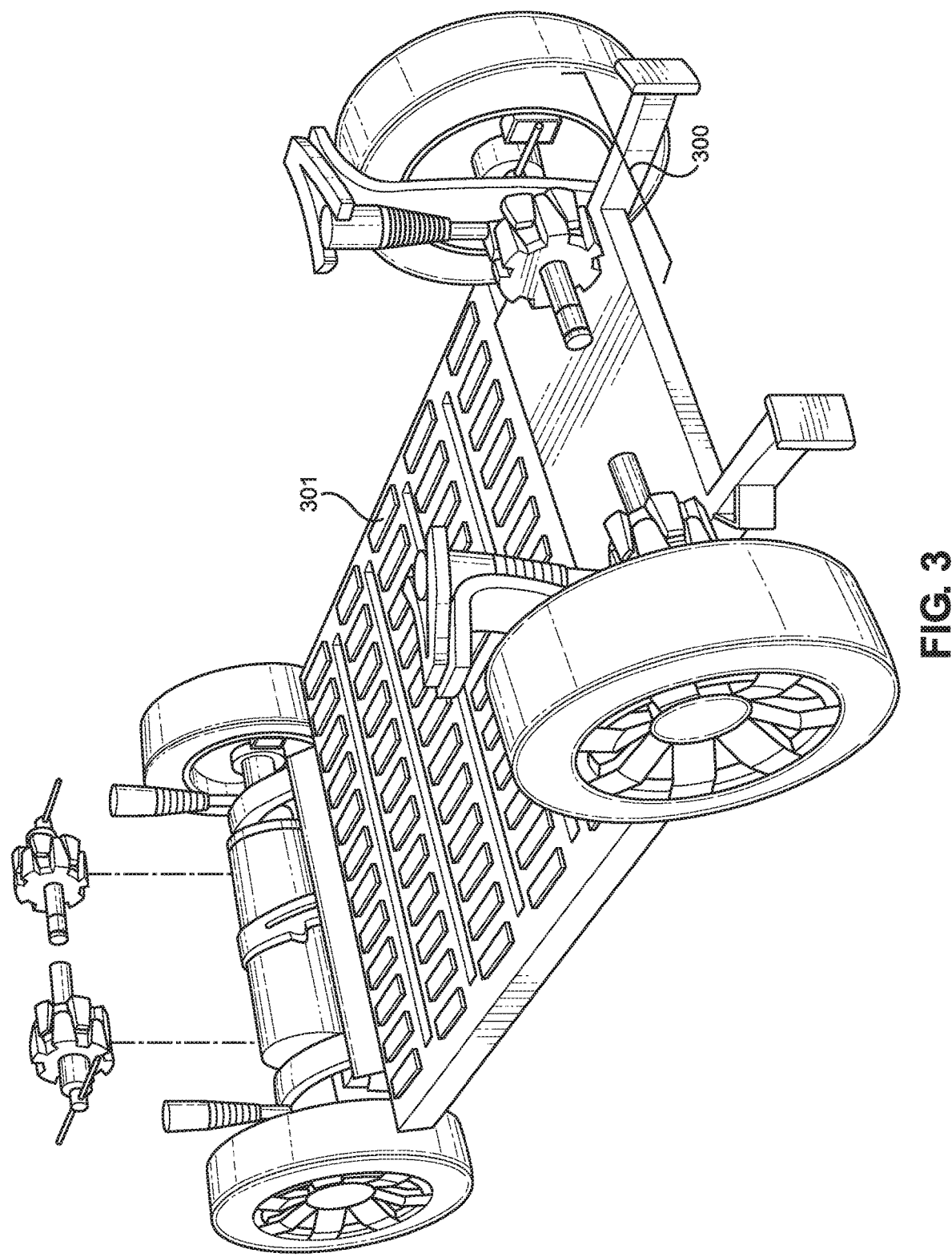
FIG. 3 shows a perspective view of an embodiment of the improved alternator system for an electric vehicle, installed in an electric car.

Referring now to FIG. 3, there is shown a perspective view of an embodiment of the improved alternator system for an electric vehicle, installed in an electric car. The improved alternator system 300 is electrically connected to a vehicle. This will allow the vehicle to charge a battery 301. In one embodiment there is an improved alternator system 300 attached to each wheel of the vehicle. This will maximize the amount of power output generated by the wheels. The battery 301 is operably coupled to the vehicle to power the vehicle.

Figure 4:
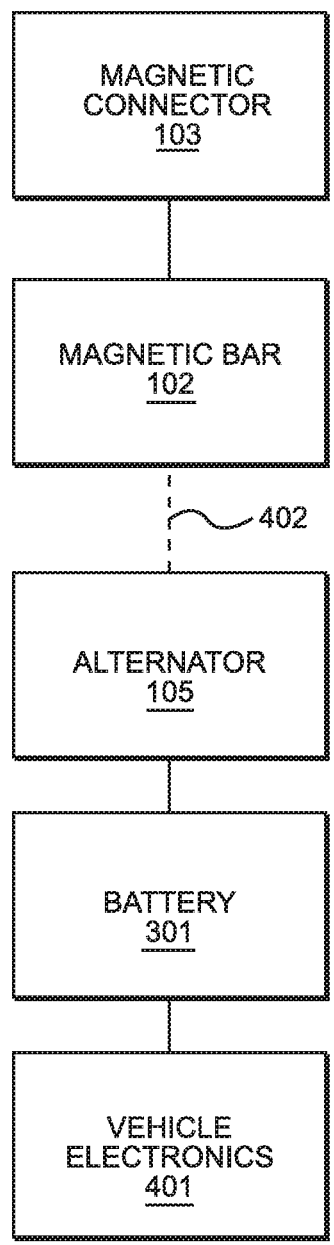
FIG. 4 shows a diagram of an embodiment of the wiring for the improved alternator system for an electric vehicle.

Referring now to FIG. 4, there is shown a diagram of an embodiment of the wiring for the improved alternator system for an electric vehicle. The magnetic connector 103 is connected to the magnetic bar 102. The magnetic bar 102 is connected to the alternator 105 via connection 402. The connection 402 connects the magnetic bar specifically to the rotator located within the alternator. The connection 402 is a magnetic connection. This means that there is no physical connection to the alternator.

The alternator is then electrically coupled to the battery 301 of the vehicle. In one embodiment there is a single battery. In another embodiment there is a battery pack comprised of multiple batteries. The battery 301 is then coupled to the vehicle electronics. The vehicle electronics 401 will can include the vehicle propulsion system, lights, windows, and horns. In other embodiments the vehicle electronics can include other items.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An improved alternator system for an electric vehicle, comprising:
   a magnetic connector attached to the rim of a wheel of a vehicle;
   a magnetic bar removably connected to the magnetic connector;
   the magnetic bar is connected to a rotator within the improved alternator, wherein the magnetic bar does not make physical contact with the alternator.

2. The improved alternator system for an electric vehicle of claim 1, wherein the magnetic connector has a magnetic pole opposite the magnetic bar and the magnetic connector is magnetically connected to the magnetic bar.

3. The improved alternator system for an electric vehicle of claim 1, wherein the magnetic bar is magnetically connected to the rotator within the improved alternator.

4. The improved alternator system for an electric vehicle of claim 1, wherein a vehicle axel is placed through the improved alternator.

5. The improved alternator system for an electric vehicle of claim 1, further comprising an electrical connection from the improved alternator to a battery.

6. An improved alternator system for an electric vehicle, comprising:
   a plurality of alternators located about the axels of each wheel of an electric vehicle;
   each of the electric alternators comprising:
   A magnetic connector attached to the rim of a wheel of a vehicle;
   A magnetic bar removably connected to the magnetic connector;
   The magnetic bar is connected to a rotator within the improved alternator, wherein the magnetic bar does not make physical contact with the alternator.

7. The improved alternator system for an electric vehicle of claim 6, wherein the magnetic connector has a magnetic pole opposite the magnetic bar and the magnetic connector is magnetically connected to the magnetic bar.

8. The improved alternator system for an electric vehicle of claim 6, wherein the magnetic bar is magnetically connected to the rotator within the improved alternator.

9. The improved alternator system for an electric vehicle of claim 6, wherein a vehicle axel is placed through the improved alternator.

10. The improved alternator system for an electric vehicle of claim 6, further comprising an electrical connection from the improved alternator to a battery.

* * * * *